May 13, 1930.  G. W. WILDIN  1,758,727
ANGLE COCK DEVICE
Filed May 3, 1926
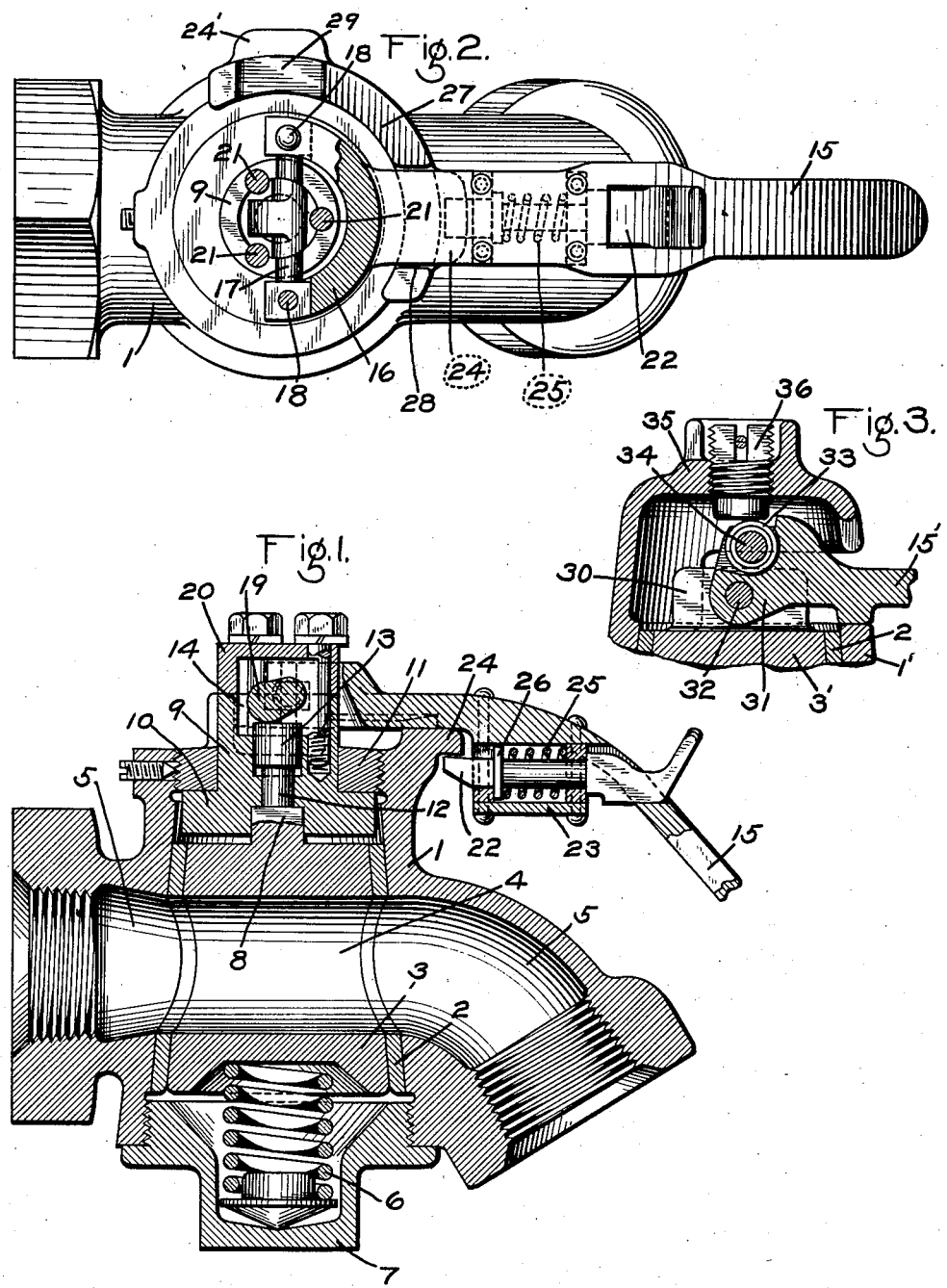
INVENTOR
GEORGE W. WILDIN
BY *Wm. M. Cady*
ATTORNEY Patented May 13, 1930

1,758,727

UNITED STATES PATENT OFFICE

GEORGE W. WILDIN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed May 3, 1926. Serial No. 106,246.

This invention relates to valves, and more particularly to hand operated tapered plug valves.

It requires considerable force to start the turning movement of a tapered plug valve, particularly as the size of the valve increases, and the principal object of my invention is to provide a plug valve having means for initially shifting the valve slightly from its seat, so that the valve may thereafter be easily rotated.

In the accompanying drawing: Fig. 1 is a central sectional view of a plug valve device of the locking angle cock type, showing my improvement applied thereto; Fig. 2 a plan view of the valve device shown in Fig. 1; and Fig. 3 a partial section of a plug valve device, showing a modified form of my invention applied thereto.

The angle cock shown in Figs. 1 and 2 is of the type used in railway service for controlling communication at opposite ends of the car through the fluid pressure train lines employed for braking and train signalling purposes.

The angle cock device shown comprises a valve body 1 having a tapered chamber containing a tapered bushing 2 which provides a seat for a tapered plug valve 3 having a port 4 which is adapted in the open position of the cock to establish communication through the conduit 5 in the cock body.

The valve 3 is subject on one side to the pressure of a coil spring 6 which is held in place by a screw-threaded cap 7. The upper end of the valve 3 is provided with a square key portion 8, which is adapted to engage in a corresponding recess provided in an operating member 9. Said member is provided with a flange portion 10 which is disposed in the space above the valve 3 and which is held in place by a ring 11 having screw-threaded engagement in the valve body 1. Extending upwardly from the recess in the member 9 which contains the key portion 8 is a central bore, and mounted in said bore to engage the end of the key portion is a pin 12 having an enlarged head 13 which extends into a chamber 14 provided at the upper portion of the member 9.

An operating handle 15 is provided having its end portion 16 bifurcated. Mounted in rectangular recesses provided in the ends of the prongs of said bifurcated portion are squared ends of a trunnion 17, which is secured in place by pins 18. Centrally, the trunnion 17 carries a cam 19 adapted to engage the upper face of the pin head 13.

The trunnion 17 is mounted in bearings provided in the member 9 and a cap 20 which is secured to the member 9 by bolts 21, so that the trunnion 17 acts as a fulcrum pin for the handle 15.

In order to lock the handle 15 in either its open or closed position, the handle is provided with a latch 22 which is mounted in a casing 23 secured to the under side of the handle. The inner end of the latch 22 engages under a flange 24, carried by the valve body 1, and the outer end of the latch extends outwardly through an opening in the handle 15, and is turned upwardly, so that the end can be operated by a finger or thumb of the hand grasping the handle.

A spring 25, mounted within the casing 23, acts on a collar 26 carried by the latch 22 and tends to maintain the latch in its locking position, as shown in the drawing.

The upper portion of the valve body is provided with a ring segment 27 having recesses 28 and 29 for receiving the handle 15 in the open and closed positions of the cock.

When it is desired to operate the valve, the handle 15 is grasped and the latch 22 is pulled out of engagement with the flange 24. The handle is then raised and thereby the cam 19 is caused to rock in engagement with the head 13. The pin 12 is thus depressed and the valve 3 is thereby forced slightly from its seat. The handle is then rotated to its closed position, and since the valve 3 does not frictionally engage its seat, the valve will turn very easily. When the handle has been rotated to its closed position, and the handle is released, the handle will engage in the recess 29 and the latch 22 will engage below the flange 24', so as to lock the handle in its closed position. The valve 3 will be moved to its seat in the bushing 2 by the pressure of spring 6.

As will be evident, the operation is the same, when it is desired to turn the cock from its closed to its open position.

According to the modified form of my invention, as shown in Fig. 3, the plug valve 3' is provided with an upwardly extending flat portion 30 and the inner end of the handle is provided with ears 31 adapted to straddle the portion 30, a pin 32 pivotally connecting the ears to said portion.

Mounted in a recess in the inner end portion of the handle is a roller 33, which is supported by a pin 34 carried by said end portion. The valve body 1' is provided at its upper portion with a cap-like extension 35, which extends over the valve 3' and the inner end of the handle 15'. A pin 36 has screw-threaded engagement in the portion 35 and the lower face of the pin is adapted to be engaged by the roller 33.

When the handle 15' is lifted, preparatory to turning the cock, the roller 33 is moved across the under face of the pin 36, with the pin 32 acting as a fulcrum for the handle, and thereby a cam action is produced, which moves the valve 3' from its seat. The handle 15' is then turned, as in the case of the construction shown in Figs. 1 and 2.

Having now described my invention, what I claim as new and desire to secure by Letters Patent, is:—

1. The combination with a valve body having a valve seat and a plug valve engaging said seat and having a key portion, of a rotatable member engaging said key portion and having a bore in alinement with said key portion, a pin in said bore engaging said key portion, a shaft rotatably mounted in said member, a cam on said shaft engaging said pin, and a handle secured to said shaft.

2. The combination with a valve body having a seat and a plug valve engaging said seat, of a pivoted handle for operating said valve, a movable latch carried by said handle, a member positioned in the path of said latch in one position of the valves, whereby pivotal movement of said handle is prevented, and manually operable means attached to said latch for withdrawing said latch, to prevent engagement of the latch with said member and thereby permit pivotal movement of the handle.

3. The combination with a valve body having a seat and a plug valve engaging said seat, of a pivoted handle for operating said valve, a movable latch carried by said handle, a member positioned to be engaged by said latch in one position of the valve if pivotal movement of said handle be attempted, and manually operable means attached to said latch and extending through an opening in said handle for shifting said latch out of position to be engaged by said member, so as to permit pivotal movement of the handle.

In testimony whereof I have hereunto set my hand.

GEORGE W. WILDIN.